United States Patent [19]
Hehl

[11] Patent Number: 4,712,991
[45] Date of Patent: Dec. 15, 1987

[54] HYDRAULIC CONTROL SYSTEM FOR INJECTION UNIT OF INJECTION MOLDING MACHINE

[76] Inventor: Karl Hehl, Arthur-Hehl-Strasse 32, 7298 Lossburg 1, Fed. Rep. of Germany

[21] Appl. No.: 814,605

[22] Filed: Dec. 30, 1985

[30] Foreign Application Priority Data

Dec. 28, 1984 [DE] Fed. Rep. of Germany ....... 3447605

[51] Int. Cl.$^4$ .............................................. B29C 45/82
[52] U.S. Cl. .................... 425/145; 264/40.3; 264/40.5; 264/40.7; 425/146; 425/149; 425/161
[58] Field of Search ............... 425/135, 146, 149, 161, 425/145; 264/40.3, 40.5, 40.7, 40.1

[56] References Cited

U.S. PATENT DOCUMENTS 4,318,874  3/1982  Lemelson ........................... 264/40.1

FOREIGN PATENT DOCUMENTS 1171757  7/1984  Canada .
 186024 12/1985  European Pat. Off. .
2099610 12/1982  United Kingdom .

OTHER PUBLICATIONS

Hydraulics, Theory and Applications, from Bosch., 1984, Robert Bosch, pp. 288-304.

Primary Examiner—Jay H. Woo
Assistant Examiner—Timothy W. Heitbrink
Attorney, Agent, or Firm—Joseph A. Geiger

[57] ABSTRACT

A hydraulic control system for the operation of three linear and one rotary hydraulic drive assemblies of the injection unit of an injection molding machine, comprising a variable delivery pump supplying drive fluid at a constant pressure gradient to several supply lines controlled by two control units which are arranged in parallel and feature proportional P/Q valves and pressure transducers, a smaller pressure maintenance pump which is controllable by a third proportional P/Q valve and switchable into one of the supply lines, and a hydraulic accumulator for the temporary supply of a large quantity of drive fluid. The proportional P/Q valves convert automatically from their flow rate programs, controlled by displacement-to-voltage converters on the injection unit, to pressure programs controlled by the pressure transducers.

17 Claims, 2 Drawing Figures

HYDRAULIC CONTROL SYSTEM FOR INJECTION UNIT OF INJECTION MOLDING MACHINE

BACKGROUND OF THE INVENTION

1. Field of the Invention

The present invention relates to hydraulic drive control systems and, more particularly, to a hydraulic control system which is adapted to operate a plurality of linear and rotational drive assemblies in the injection unit of a plastics injection molding machine.

2. Description of the Prior Art

The high performance levels required of modern injection molding machines, and the need for operational adaptability to a wide variety of conditions make it necessary to generate all the movement phases of the injection cycle by means of hydraulic drive units in the form of linear hydraulic motors, viz. hydraulic cylinder assemblies, and rotary hydraulic motors.

The relatively simple hydraulic control systems of the past are giving way to increasingly sophisticated control systems designed to improve the energy efficiency of the system, while also offering a greater versatility and adaptability to changing operational requirements dictated by the nature of the parts which are to be injection-molded.

It is known that the efficiency of a hydraulic drive system, in terms of the ratio between the energy transmitted and the energy consumed, can be greatly improved by using, instead of a control system with a source of constant pressure and pressure-throttling valves, a control system with a continuously variable pressure source in a load-sensing feedback circuit.

It has therefore already been suggested to use as a pressure source a variable delivery hydraulic pump, the output of which is continuously adjusted by means of a pump adjustment unit which receives pressure feedback signals from the supply line leading to the drive assembly and, in response thereto, adjusts the output pressure of the pump to the pressure level in the supply line.

The flow rate and the pressure in the supply line are adjustable by means of appropriate control valves, a preferred type of valve being the so-called proportional-response valve with an adjustment position transducer which makes it possible to directly feed the desired adjustment values to the drive solenoid of the valve.

The latest improvement which has been suggested in this field relates to the use of so-called proportional P/Q valves which make it is possible to alternatingly control the pressure (P) and the flow rate (Q) in the supply line. A proportional P/Q valve thus takes the place of separate control valves for the pressure program and for the flow rate program.

The proportional P/Q valve operates under a constant, low pressure gradient which is maintained by a spring-biased pump adjustment valve, through the continuous adjustment of the pump output pressure to a level which exceeds the supply line pressure downstream of the proportional P/Q valve by a small pressure drop of constant size, the operational pressure gradient.

A hydraulic control system using a proportional flow control valve is disclosed in the German Pat. No. 31 19 095 and in the corresponding Canadian Pat. No. 1,171,757. Structural and operational details of proportional valves are found in the handbook "Hydraulics: Theory and Applications" (1984) published by the Robert Bosch GmbH, Stuttgart, Germany.

Typically, a hydraulic drive operation involves a displacement phase during which the speed or flow rate represents the limiting factor and a pressure phase during which the force or fluid pressure is controlled. Corresponding programs of flow rate limits and pressure limits are fed to the proportional P/Q valve.

As soon as the supply line pressure downstream of the proportional P/Q valve reaches the pressure limit of the flow rate program, the adjustment operation of the valve automatically converts from following the flow rate program to following the pressure program.

A flow rate program may be fed to the proportional P/Q valve either in a direct control configuration in which the valve settings are verified by an adjustment position transducer of the valve which is coupled to its proportional-response solenoid, or in a feedback control configuration using a feedback circuit with a separate signal source, such as a flow metering device in the supply line, or a displacement-to-voltage converter which is operatively connected to the driven load.

A pressure program is normally fed to the proportional P/Q valve in a feedback control configuration using a feedback circuit with a pressure transducer which is arranged in the supply line downstream of the valve.

SUMMARY OF THE INVENTION

Underlying the present invention is the primary objective of suggesting a novel hydraulic control system for the operation of the various hydraulic drive assemblies of the injection unit of an injection molding machine, whereby the control system is to have a high level of energy efficiency and a wide range of adaptive capabilities through the use of proportional P/Q valves.

The present invention proposes to attain this objective by suggesting a hydraulic control system for the operation of a plurality of linear hydraulic drive assemblies in the form of hydraulic cylinder assemblies and a rotary hydraulic drive assembly in the form of a hydraulic motor, the hydraulic control system comprising a first variable delivery pump of relatively large capacity feeding drive fluid to a first supply line and to at least a second supply line controlled by a first and second control unit, respectively, each control unit having a proportional P/Q valve and a pressure transducer, the first control unit being associated with a feedback line connecting the supply line downstream of the first proportional P/Q valve with the pump adjustment unit of the first variable delivery pump for the establishment of a constant pressure gradient between the pump output pressure and the pressure in the first supply line.

The proposed hydraulic control system further comprises a second variable delivery pump of smaller capacity serving as a pressure maintenance pump, whereby, for the operation of the unit-displacing cylinder assembly, which displaces the injection unit towards and away from the injection molding die, the supply of drive fluid to said cylinder assembly from the first variable delivery pump is controllable by the proportional P/Q valve of the first control unit, either under a flow rate program in a feedback circuit with a displacement-to-voltage converter on the injection unit, or under a pressure program in a feedback circuit with a pressure transducer in the first supply line, and the supply of drive fluid is switchable from the first variable delivery pump and first control unit to the pressure maintenance pump and a pressure-controlling valve, for the forcible engagement of the plastification cylinder of the injection unit against the injection molding die, and whereby, for the operation of the injection cylinder assembly, the flow rate and pressure of the drive fluid from the first variable delivery pump are similarly controllable by the second proportional P/Q valve of the second control unit, in similar feedback circuits, and the proportional P/Q valve of the first control unit serves to maintain a constant operational pressure gradient for the second proportional P/Q valve.

The hydraulic control system of the invention further comprises directional control valve means for the switchover of the fluid which is supplied by the variable delivery pump and controlled by the proportional P/Q valve of the first control unit from the unit-displacing cylinder assembly to the hydraulic motor of the plastification screw.

As an optional modification of the proposed hydraulic control system, the present invention further suggests the addition to the control system of a hydraulic accumulator which directional control valve means which are adapted to supply drive fluid at an elevated rate of flow to the cylinder space of the injection cylinder assembly, for an accelerated injection stroke. The hydraulic accumulator is rechargeable by either the first variable delivery pump of by the pressure maintenance pump, or simultaneously by both pumps.

Lastly, the invention suggests a directional control valve means which is operable to selectively interconnect the cylinder space of the injection cylinder assembly with the cylinder space of the screw-retracting cylinder assembly, which displace the plastification screw in opposite directions, thereby producing a differential-piston effect for a more accurate control of the displacement of the plastification screw.

By using multiple control units with proportional P/Q valves, the hydraulic control system of the invention produces a drive operation at a high degree of energy efficiency. The control system also offers adaptability to a wide range of different operational parameters, as required by the nature of the parts to be injection-molded and the plastic raw materials used.

The use of the proportional P/Q valve of the first control unit as the valve which controls the operational pressure gradient for the proportional P/Q valve of the second control unit makes it easy to select a different optimal pressure gradient for the second proportional P/Q valve, depending on the drive requirements. A higher operational pressure gradient, for example, makes it possible to achieve a faster response of the proportional P/Q valve.

The proportional P/Q valves have built-in adjustment position transducers for the input of the flow rate programs in a direct-control configuration, but displacement-to-voltage converters connected to the linear drives and a proximity switch in the rotational drive permit a more accurate input of the flow rate programs in a feedback-control configuration.

BRIEF DESCRIPTION OF THE DRAWINGS

Further special features and advantages of the invention will become apparent from the description following below, when taken together with the accompanying drawing which illustrates, by way of example, preferred embodiments of the invention which are represented in the various figures as follows.

DESCRIPTION OF THE PREFERRED EMBODIMENTS

Figure 1:
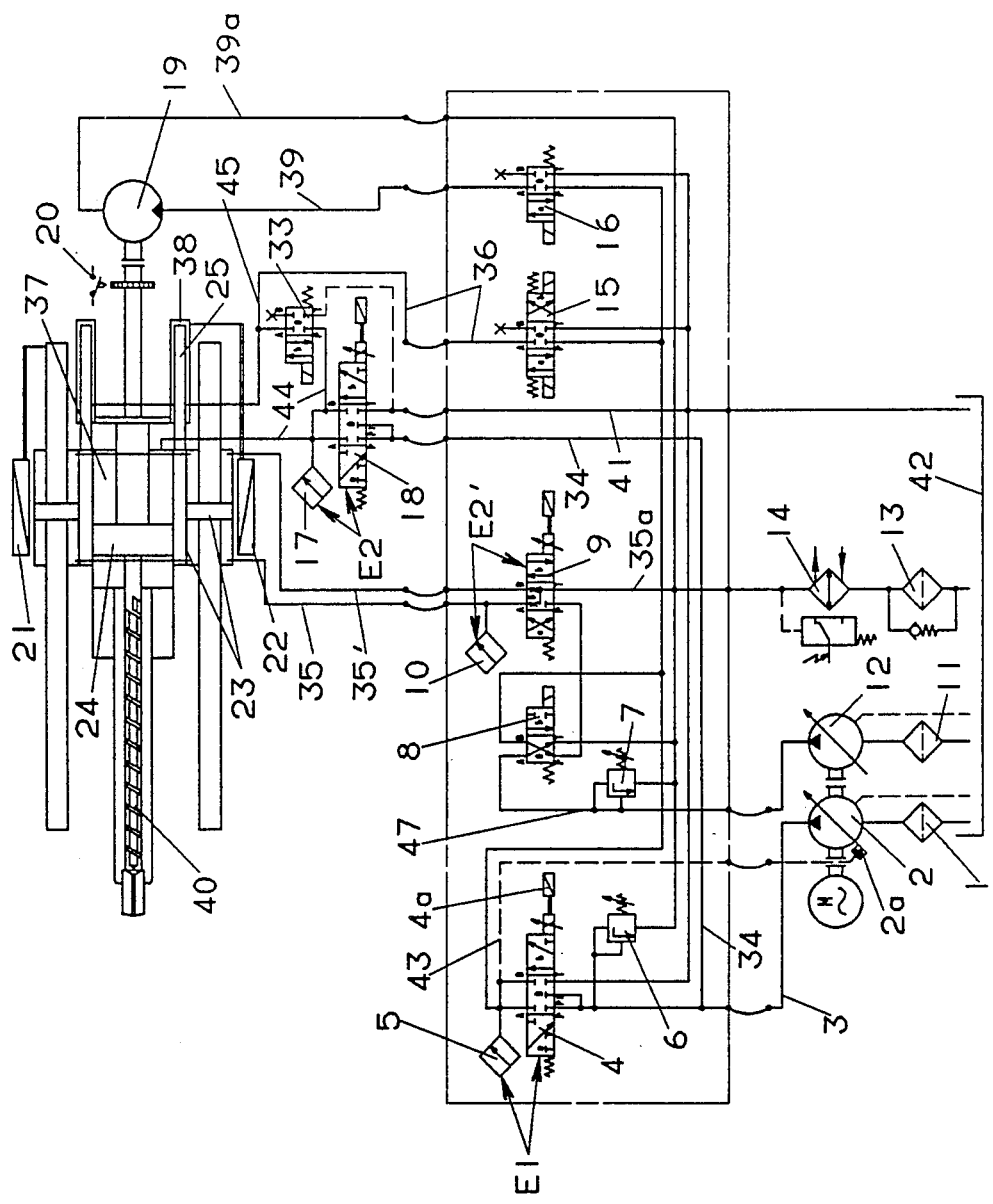
FIG. 1 shows a hydraulic control diagram representing an embodiment of the invention in the form of a hydraulic control system for the operation of the injection unit of an injection molding machine.

The hydraulic control system of the invention is designed to supply drive fluid to the hydraulic drive assemblies which operate the injection unit of an injection molding machine. These drive assemblies include a first cylinder assembly for the displacement of the injection unit towards and away from the injection molding die, the plastification cylinder remaining forcibly engaged against the injection molding die during the injection phase, a second hydraulic cylinder assembly for the forward movement of the plastification screw inside the plastification cylinder injecting the plastic raw material into the injection molding die and for the application of a forward-directed force to the plastification screw, as it is being backed up by the raw material during plastification, a third hydraulic cylinder assembly for the retraction of the plastification screw, and a hydraulic motor for the rotation of the plastification screw, during the plastification of the raw material.

The screw-retracting cylinder assembly produces a pressure-relieving action in the plastification cylinder with a small retracting movement of the plastification screw, prior to disengagement of the plastification cylinder from the injection molding die. The screw-retracting cylinder assembly can also be used to retract the plastification screw for purposes of cleaning or replacement.

The hydraulic loads of the injection unit receive pressurized drive fluid through suitable supply lines from a variable delivery pump 2 of relatively large capacity and from a pressure maintenance pump 12 of relatively small capacity, the latter being likewise a variable delivery pump. The variable delivery pumps 2 and 12 draw drive fluid from a fluid reservoir 42, via their respective intake filters 1 and 11. The spent fluid is returned to the fluid reservoir 42 through a return line 35a which leads through an oil cooler 14 and a return filter 13.

A supply line 3, protected by a pressure relief valve 6, leads from the variable delivery pump 2 to a first control unit $E_1$ which includes a proportional P/Q valve 4 with a pressure transducer 5. The latter serves as the feedback source, under operation of the proportional P/Q valve 4 in accordance with a pressure control program.

The control unit $E_1$ has a feedback line 43 leading from a point on the supply line 3 downstream of the proportional P/Q valve 4 to the pump adjustment unit 2a of the variable delivery pump 2, thereby making it possible for the pump adjustment unit 2a to establish a constant operational pressure gradient for the proportional P/Q valve 4.

Figure 2:
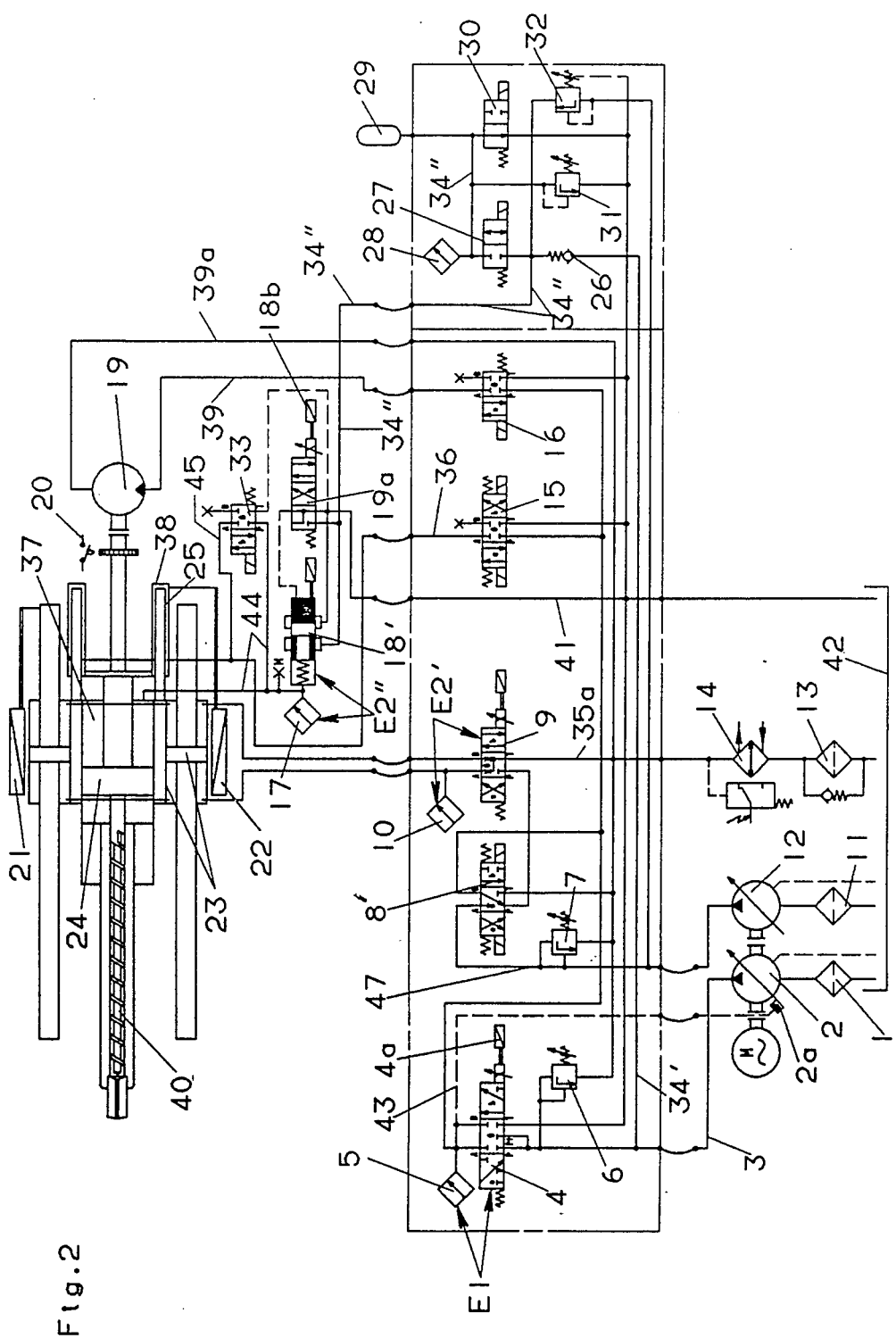
FIG. 2 shows a modification of the hydraulic control system of FIG. 1 featuring the addition of a hydraulic accumulator.

The control unit $E_1$ cooperates with a second control unit which is similar to the control unit $E_1$ and designated $E_2$ in FIG. 1 and $E_2''$ in FIG. 2, respectively. The control unit $E_2$ or $E_2''$ cooperates with a displacement-to-voltage converter 22, for the operation of the proportional P/Q valve 18 or 18', respectively, under a displacement-based control program.

For the operation which produces the injection of the plastic raw material, the hydraulic control system may further include a hydraulic accumulator 29 with a pressure transducer 28 and a directional control valve 27 (FIG. 2).

The cylinder space 37 of the injection cylinder assembly 24 which produces a forward movement of the plastification screw 40, and the cylinder spaces 38 of two screw-retracting cylinder assemblies 25 are linkable by means of a directional control valve 33. Downstream of the control unit $E_1$, in the supply line 35 which leads to the unit-displacing cylinder assembly 23, is arranged a control unit $E_2'$, and in the supply line 36 leading to the screw-retracting cylinder assembly 25 is arranged a directional control valve 15.

Upstream of the control unit $E_1$, in the supply line 34 leading to the injection cylinder assembly 24, is arranged another control unit $E_2$ (FIG. 1) or $E_2''$ (FIG. 2). A supply line 39 which leads to the rotary hydraulic motor 19 for the plastification screw 40, via a directional control valve 16, is likewise controlled by the control unit $E_1$.

The pressure maintenance pump 12 feeds the unit-displacing cylinder assembly 23 via a switching valve 8 and a control unit $E_2'$ with a proportional P/Q valve 9. The hydraulic accumulator 29 can be recharged during injection of the plastic raw material and during the subsequent after-pressurization of the plastic raw material in the injection molding die, either by means of the variable delivery pump 2, via the control unit $E_1$ and the directional control valve 27, or by means of the pressure maintenance pump 12, via the pressure inlet valve 32, or simultaneously by means of the variable delivery pump 2 and the pressure maintenance pump 12. In the supply line 47 of the pressure maintenance pump 12 is arranged a pressure relief valve 7.

All the required drive speeds and pressures of the proposed hydraulic control system are controllable in a closed circuit, with a minimal loss of energy and with a small number of hydraulic control components.

In the following, the operation of the novel hydraulic control system of the invention will be described with the aid of several specific application examples relating to the various drive operations which are required in the course of an injection cycle:

Application Example 1: Displacement of the injection unit toward or away from the injection molding die-first version:

In this application, the control unit $E_2'$ with its proportional P/Q valve 9 and pressure transducer 10 serves as a switching valve. The speed of movement (flow rate) and the pressure are being adjusted by means of the control unit $E_1$ with its proportional P/Q valve 4 and pressure transducer 5. The feedback action through the feedback line 43 to the pump adjustment unit 2a of the variable delivery pump 2 maintains a constant operational pressure gradient.

Under a flow rate program, the speed of movement is verified by means of the displacement-to-voltage converter 21 which also operates as a displacement transducer to signal the end of the injection unit displacement. Alternatively, it would be possible to directly feed the programmed values to the proportional P/Q valve 4 of the control unit $E_1$. In this case, the verification is made in the proportional P/Q valve 4 itself which, for this purpose, has a built-in adjustment position transducer 4a.

The control program provides that, when a predetermined pressure level is reached during the approach movement of the unit-displacing cylinder assembly 23, the flow rate program shifts to a pressure program and the proportional P/Q valve 4 shifts automatically from flow-rate-based valve settings to pressure-based valve settings. Under a pressure program, the valve settings are verified against the signals received from the pressure transducer 5.

Following the establishment of the program-determined engagement pressure between the injector nozzle at the tip of the plastification cylinder and the sprue of the injection molding die, as verified by the pressure transducer 5 and by the pressure transducer 10, which serves as a backup for safety purposes, the switching valve 8 is actuated to effect the following changes: The pressure source for the supply line 35 is switched from the variable delivery pump 2 to the pressure maintenance pump 12. The proportional P/Q valve 9 of the control unit $E_2'$ now operates under a pressure control program, with the pressure transducer 10 providing the feedback information. The variable delivery pump 2 is adjusted to zero output.

Application Example 2: Displacement of the injection unit toward or away from the injection molding die-second version:

The flow rate program and the pressure program are fed to the proportional P/Q valve 9 of the control unit $E_2'$. The drive fluid is supplied to the supply line 35 by either the variable delivery pump 2 or the pressure maintenance pump 12, depending on the flow rate requirements. The switchover from one pump to the other is again performed by the switching valve 8.

The feedback information for a flow-rate program and the end-of-stroke signal for the approach movement are again provided by the displacement-to-voltage converter 21. The feedback information for a pressure program is provided by the pressure transducer 10.

Application Example 3: Plastification (Metering of the plastic raw material):

This operational phase involves a rotation of the plastification screw 40 by means of the rotary hydraulic motor 19 which receives drive fluid through the supply line 39. The rotating plastification screw 40 advances the plastic material from an inlet chute to the forward portion of the plastification cylinder, where the raw material is compressed and plastified while being heated, as the plastification screw 40 is forcibly backed up.

The rotary hydraulic motor 19 is supplied with drive fluid via the control unit $E_1$ and the directional control valve 16. The used drive fluid returns to the fluid reservoir 42 through the return line 39a, via the oil cooler 14 and the return filter 13. The desired rotational speed of the plastification screw 40 is adjustable under a flow rate program which is fed to the proportional P/Q valve 4 of the control unit $E_1$ as a direct control input. In this case, the setting of the valve 4 is verified by the adjustment position transducer 4a of the proportional P/Q valve 4.

As an alternative to the direct control of the rotational speed of the plastification screw 40, the hydraulic control system of the invention provides for a feedback control of the screw speed by means of a feedback circuit receiving speed information from an inductive proximity switch 20 in the injection unit.

As soon as a predetermined supply pressure, representative of a torque limit on the plastification screw 40, is reached and signaled by the pressure transducer 5 of the control unit $E_1$, the control operation in the proportional P/Q valve 4 shifts from the flow rate program to a pressure program, under which the drive torque of the rotary hydraulic motor 19 is controlled.

As the plastification screw 40 is backed up by the accumulating plastic raw material, a controlled axial counter-force is exerted on the plastification screw 40 by the piston of the injection cylinder assembly 24. This plastification pressure is controlled by means of the proportional P/Q valve 18 of the control unit $E_2$, under a pressure control program. The pressure values are verified through feedback from the pressure transducer 17.

The pistons of the two screw-retracting cylinder assemblies 25 being fixedly connected to the cylinder of the injection cylinder assembly 24, the cylinder spaces 38 of the two screw-retracting cylinder assemblies 25 expand as the plastification screw 40 backs up. This expansion is accommodated by connecting the cylinder spaces 38 of the two screw-retracting cylinder assemblies 25 to the fluid reservoir 42, via the supply line 36 and the drain line 41, in a switching movement of the directional control valve 15 in the supply line 36. At the same time as the screw-retracting cylinder assemblies 25 draw fluid into their expanding cylinder spaces 38 from the drain line 41, the contracting cylinder space 37 of the injection cylinder assembly 24 discharges fluid through the same return line 41. The net flow in the drain line 41 is to the fluid reservoir 42.

The invention offers an alternative method of controlling the pressure with is exerted on the plastification screw 40, as it is backed up by the accumulating raw material, an approach which is particularly advantageous, when a more accurate control performance during the pastification phase is desired.

As in the control configuration just described, the hydraulic pressure for the counter-force in the cylinder space 37 of the injection cylinder assembly 24 is controlled by the proportional P/Q valve 18 of the control unit $E_2$, in accordance with a pressure program, and verified by the pressure transducer 17 in a feedback circuit.

The difference resides in the establishment of a hydraulic connection between the cylinder space 37 of the injection cylinder assembly 24 and the cylinder spaces 38 of the two screw-retracting cylinder assemblies 25 by means of the hydraulic lines 44 and 45 and the directional control valve 33. The directional control valve 15 is closed. In this configuration, the expanding cylinder spaces 38 receive fluid from the contracting cylinder space 37, thus providing a more sensitive differential-piston action.

The result is a smaller effective piston area and a correspondingly higher pressure at the proportional P/Q valve 18 of the control unit $E_2$. The higher control pressure represents a magnified range of control settings, thereby providing a greater accuracy in the control settings.

Application Example 4: Injection of the plastic raw material into the injection molding die:

The flow rate, representing the injection speed, i.e. the speed of forward movement of the piston of the injection cylinder assembly 24 and the plastification screw 40 connected to it, as well as the injection pressure, as determined by the axial thrust which is applied to the plastification screw 40, are controlled by means of the proportional P/Q valve 18 of the control unit $E_2$.

For this purpose, the injection unit has a displacement-to-voltage converter 22 which serves as a displacement transducer for the verification of both the movement speed and the position of the plastification screw 40. Under the pressure control program, the pressure transducer 17 serves to verify the hydraulic pressure in the cylinder space 37.

The operational pressure gradient for the control of the proportional P/Q valve 18 of the control unit $E_2$, i.e. the pressure drop between the supply line 3 on the output side of the variable delivery pump 2 and the line 44 downstream of the proportional P/Q valve 18, is in this case not determined by a feedback connection between the line 44 and the pump adjustment unit 2a, but by the setting of the proportional P/Q valve 4 of the control unit $E_1$.

Accordingly, the magnitude of the operational pressure gradient can be set and continuously controlled by the control computer which, based upon the signal received from the pressure transducer 5, adjusts the proportional P/Q valve 4 to open by an amount which establishes the necessary control pressure in the feedback line 43 which produces the desired operational pressure gradient for the proportional P/Q valve 18.

Accordingly, if the pump adjustment unit 2a is adjusted for an operational pressure gradient of, for example, 11 bar for the proportional P/Q valve 4, and if the desired operational pressure gradient for the proportional P/Q valve 18 is 20 bar, for example, then the proportional P/Q valve 4 will have to be controlled under a pressure program which adjusts a pressure in the feedback line 43 and in the pressure transducer 5 which is at all times 9 bars higher than the pressure in the pressure transducer 17 of the proportional P/Q valve 18.

By feeding the pressure fluid from the variable delivery pump 2 directly to the injection cylinder assembly 24, via the supply line 34 and the proportional P/Q valve 18 of the control unit $E_2$, the hydraulic control system operates with an optimal energy efficiency during the injection phase of the injection molding cycle.

A further improvement is achieved by arranging the control unit $E_2$ directly on the plastification cylinder of the injection unit, so that extremely short supply lines are possible and the accuracy of control is further improved. During the injection stroke, the cylinder spaces 38 of the two screw-retracting cylinder assemblies 25 are open to the fluid reservoir 42, via the supply line 36, the directional control valve 15, and the drain line 41.

Under certain circumstances, however, when it is desirable to operate with a higher injection speed, the injection movement can be produced with the following modified configuration:

By connecting the cylinder spaces 38 of the two screw-retracting cylinder assemblies 25 with the cylinder space 37 of the injection cylinder assembly 24, via the lines 44 and 45 and the directional control valve 33, the pistons of the injection cylinder assembly 24 and of the two screw-retracting cylinder assemblies 25 are again used as a single differential-action piston assembly of smaller effective area, with the result that a greater speed of advance is achieved with a given flow rate. In this case, the directional control valve 15 is closed.

Application Example 5: Retraction of the plastification screw and pressure removal from the plastification cylinder:

A retraction of the plastification screw 40 is obtained through a switching action of the directional control valve 15 in the supply line 36, whereby the line 36 is connected to the supply line 3 which is controlled by the proportional P/Q valve 4 of the control unit $E_1$. At the same time, the proportional P/Q valve 18 of the control unit $E_2$ is switched to the position in which the line 44 communicates with the drain line 41, thereby connecting the cylinder space 37 of the injection cylinder assembly 24 with the fluid reservoir 42. The speed of movement and the pressure in the screw-retracting cylinder assemblies 25 are controlled by the proportional P/Q valve 4 of the control unit $E_1$.

As in several of the earlier-described application examples, the flow control program can be fed directly to the proportional P/Q valve 4, using its adjustment position transducer 4a, or, the flow rate can be verified in a feedback circuit with the displacement-to-voltage converter 22 of the injection unit. Feedback control under a pressure program can be provided by the pressure transducer 5, but is normally not necessary, as only a very small screw retraction is necessary to remove the pressure from the plastification cylinder, before the latter is moved away from the injection molding die (Application Example 1 or 2).

Application Example 6: High-speed injection of the plastic raw material with the aid of a pressure accumulator:

A very rapid injection of the plastic raw material is accomplished by using a hydraulic accumulator 29 (FIG. 2) which holds a sufficient volume of pressurized drive fluid to drive the piston of the injection cylinder assembly 24 in the injection stroke.

For this purpose, the hydraulic accumulator 29 is connectable to the injection cylinder assembly 24, via the supply line 34" with the proportional P/Q valve 18' of the control unit $E_2$", and via the line 44. This drive connection is controlled by a directional control valve 27. The pressure transducer 28 signals the pressure level in the hydraulic accumulator 29.

The hydraulic control system is so arranged that the hydraulic accumulator 29 can be partially recharged during the injection phase and during the after-pressurization of the plastic raw material in the injection molding die. The hydraulic accumulator 29 may receive its charge from the variable delivery pump 2, via the supply line 34, the check valve 26 and the directional control valve 27, or it may be charged by means of the pressure maintenance pump 12, via the switching valve 8' and the pressure inlet valve 32. It is also possible to charge the hydraulic accumulator 29 by using both pumps simultaneously.

When the hydraulic accumulator 29 is charged by means of the variable delivery pump 2, the charging pressure is controllable either through feedback from the pressure transducer 5 of the control unit $E_1$, or through feedback from the pressure transducer 28 of the accumulator 29. The accumulator charge is preferably adapted to the consumption of the injection cylinder assembly 24 in such a way that the accumulator pressure which remains at the end of the injection stroke is a small amount higher than the pressure level which is necessary to produce the necessary axial injection pressure on the plastification screw 40.

In order to accommodate the relatively large flow rates which may occur in an accumulator-driven injection stroke, the control valve of the control unit $E_2$" is preferably a pilot-controlled proportional P/Q valve 18'. The pilot valve 19a of the proportional P/Q valve 18' adjusts the spool of the valve 18' in opposition to a return spring 18c. A pressure relief valve 31 protects the hydraulic accumulator 29 against accidental overcharging. The directional control valve 30 serves to empty the hydraulic accumulator 29 into the fluid reservoir 42.

It should be understood that, while the foregoing disclosure suggests the use of several control units with proportional P/Q valves, the proposed hydraulic control system could also be operated with servo valves.

Complete details of an injection unit having the hydraulic drive features referred to in the above application examples are disclosed in my German Patent Application No. P 34 47 707.1 of 28 Dec. 1984 and in a corresponding U.S. Application entitled "Injection Unit for an Injection Molding Machine", filed on 30 Dec. 1985. The disclosure of said U.S. application should be considered incorporated herein by reference.

It is to be understood that the invention is not limited in its application to the details of construction and arrangement of parts illustrated in the accompanying drawings, since the invention is capable of other embodiments and of being practiced or carried out in various ways. It is also to be understood that the phraseology or terminology employed herein is for the purpose of description and not of limitation.

I claim the following:

1. A hydraulic control system for the operation of a plurality of hydraulic drive assemblies of the type which are used in the hydraulic drive system of an injection unit of a plastics injection molding machine, the hydraulic control system comprising in combination:

a main pump feeding drive fluid to a supply line, the main pump being in the form of a first variable delivery pump of comparatively large capacity which includes a pump adjustment unit for the continuous adjustment of the output of the main pump;

a first branch line leading from the supply line to a first drive assembly of the hydraulic drive system, the first branch line including a first switching valve;

a pressure maintenance pump in the form of a second variable delivery pump of comparatively small capacity, the pressure maintenance pump feeding drive fluid to the first switching valve, the first switching valve being operable to selectively connect the first drive assembly to either of said two pumps, whereby the output of the main pump is used to generate displacements of the first drive assembly and the output of the pressure maintenance pump is used to maintain the first drive assembly under pressure, after the first drive assembly has reached a displacement end point; and a first control unit arranged in the supply line, between the main pump and the first branch line, the first control unit including a first proportional P/Q valve, where P is pressure and Q is flow rate, a feedback line leading from the supply line on the downstream side of the first proportional P/Q valve to the pump adjustment unit of the main pump, displacement transducing means operable to provide feedback-control for the execution of a displacement-referenced control program on the pump adjustment unit of the main pump, and a pressure transducer arranged in the supply line, on the downstream side of the first proportional P/Q valve, providing feedback control for the execution of a pressure-referenced control program on the pump adjustment unit of the main pump, at pressures in the supply line which exceed a predetermined pressure level at which the first proportional P/Q valve converts from volume control to pressure control, the pump adjustment unit being set for the maintenance of a predetermined constant pressure gradient in the supply line between the upstream and downstream sides of the first proportional P/Q valve.

2. A hydraulic control system as defined in claim 1, wherein
the main pump and the pressure maintenance pump are coupled together and driven by a common drive source.

3. A hydraulic control system as defined in claim 1, wherein
the displacement transducing means of the first control unit is an adjustment position transducer which forms a part of the first proportional P/Q valve.

4. A hydraulic control system as defined in claim 1, wherein
the displacement transducing means of the first control unit is a displacement-to-voltage converter which is connected to the first drive assembly, generating a feedback control voltage which reflects the displacement position of the first drive assembly.

5. A hydraulic control system as defined in claim 1, further comprising
an second control unit arranged in the first branch line, downstream of the first switching valve, the second control unit including a second proportional P/Q valve and a second pressure transducer in the first branch line, on the downstream side of the second proportional P/Q valve, the second proportional P/Q valve operating as a switching valve, when the first drive assembly is driven by the main pump, under a displacement-referenced control program executed by the first proportional P/Q valve, and the second proportional P/Q valve executing a pressure-referenced control program, using feedback from the second pressure transducer, when the first drive assembly is driven by the pressure maintenance pump.

6. A hydraulic control system as defined in claim 5, further comprising
a second branch line branching off the supply line, downstream of the first branch line, the second branch line including a second switching valve and leading to a second drive assembly, the first and second switching valves being arranged to cooperate in such a way that the output of the main pump is supplied to the second branch line and controlled by the first proportional P/Q valve, when the first branch line receives the output of the pressure maintenance pump.

7. A hydraulic control system as defined in claim 6, further comprising
a third branch line branching off the supply line, downstream of the first branch line, the third branch line including a third switching valve and leading to a third drive assembly; and wherein
the first and second drive assemblies are linear drive assemblies in the form of hydraulic cylinder assemblies, and the third drive assembly is a rotary drive assembly in the form of a hydraulic motor; and
the first, second and third switching valves are arranged to cooperate in such a way that the output of the main pump is supplied selectively to the second and third branch lines and program-controlled by the first proportional P/Q valve, when the first branch line receives the output of the pressure maintenance pump.

8. A hydraulic control system for the operation of a plurality of hydraulic drive assemblies, such as the linear and rotary hydraulic drive assemblies which drive an injection unit of a plastics injection molding machine, which drive assemblies include a first cylinder assembly for the movement of the injection unit into engagement with and away from an injection molding die of the injection molding machine, a second cylinder assembly of axially advancing a plastification screw inside a plastification cylinder in an injection stroke and for exerting counter-pressure on the plastification screw during a plastification stroke, a third cylinder assembly for retracting the plastification screw away from the injection molding die, and a rotary drive assembly for the rotation of the plastification screw during the plastification stroke, the hydraulic control system comprising in combination:
a main pump in the form of a first variable delivery pump which includes a pump adjustment unit for the continuous adjustment of the output of the main pump;
a first supply line and a second supply line connected to the output side of the main pump, the first supply line leading to the first cylinder assembly and the second supply line leading to the second cylinder assembly;
a first switching valve arranged in the first supply line;
a first control unit arranged in the first supply line, between the main pump and the first switching valve, the first control unit including a first proportional P/Q valve where P is pressure and Q is flow rate, a feedback line leading from the first supply line on the downstream side of the first proportional P/Q valve to the pump adjustment unit of the main pump, displacement transducing means operable to provide feedback-control for the execution of a displacement-referenced control program on the pump adjustment unit of the main pump, and a pressure transducer arranged in the first supply line, on the downstream side of the first proportional P/Q valve, providing feedback control for the execution of a pressure-referenced control program on the pump adjustment unit of the main pump, at pressures in the first supply line which exceed a predetermined pressure level at which the first proportional P/Q valve converts from volume control to pressure control, the pump adjustment unit being set for the maintenance of a predetermined constant pressure gradient in the first supply line between the upstream and downstream sides of the first proportional P/Q valve; and
a second control unit arranged in the second supply line, the second control unit inluding a second proportional P/Q valve, displacement transducing means operable to provide feedback-control for the execution of a displacement-referenced control program on the pump adjustment unit of the main pump, and a pressure transducer arranged in the second supply line, on the downstream side of the second proportional P/Q valve, providing feedback control for the execution of a pressure-referenced control program on the pump adjustment unit of the main pump, at pressure in the second supply line which exceed a predetermined pressure level at which the second proportional P/Q valve converts from volume control to pressure control; and wherein the first and second control units are arranged to cooperate in such a way that, for a movement of the injection unit against the injection molding die through the operation of the first cylinder assembly, the second proportional P/Q valve of the second control unit is closed and, for the execution of an injection stroke of the plastification screw through the operation of the second cylinder assembly, the first switching valve in the first supply line disconnects the first proportional P/Q valve from the first supply line, while the first proportional P/Q valve maintains a predetermined constant pressure gradient in the second supply line between the upstream and downstream sides of the second proportional P/Q valve.

9. A hydraulic control system as defined in claim 8, wherein the displacement transducing means of the first control unit is a displacement-to-voltage converter which is operatively connected to the first cylinder assembly, generating a feedback control voltage which reflects the position of the injection unit relative to the injection molding die; and the displacement transducing means of the second control unit is a displacement-to-voltage converter which is operatively connected to the second cylinder assembly, generating a feedback control voltage which reflects the position of the plastification screw relative to the plastification cylinder.

10. A hydraulic control system as defined in claim 8, further comprising a pressure maintenance pump in the form of a second variable delivery pump of much smaller output capacity than the main pump, the pressure maintenance pump feeding drive fluid to the first supply line, via a load line leading form the pressure maintenance pump to the first switching valve, the first switching valve being operable to selectively connect the first cylinder assembly to either of said two pumps, whereby the output of the main pump is used to operate the first cylinder assembly to move the injection unit into engagement with the injection molding die, and the output of the pressure maintenance pump is used to maintain the first cylinder assembly under pressure, when the injection unit is engaged against the injection molding die.

11. A hydraulic control system as defined in claim 10, further comprising a branch line branching off the first supply line between the first proportional P/Q valve and the first switching valve, the branch line including a second switching valve and leading to a the rotary drive assembly, the first and second switching valves being arranged to cooperate in such a way that the output of the main pump is supplied to the rotary drive assembly, via the branch line, and controlled by the first proportional P/Q valve, when the first cylinder assembly is supplied by the pressure maintenance pump.

12. A hydraulic control system as defined in claim 10, further comprising a branch line branching off the first supply line between the first proportional P/Q valve and the first switching valve, the branch line including a second switching valve and leading to a the third cylinder assembly, the first and second switching valves being arranged to cooperate in such a way that the output of the main pump is supplied to the third cylinder assembly, via the branch line, and controlled by the first proportional P/Q valve, when the first cylinder assembly is supplied by the pressure maintenance pump.

13. A hydraulic control system as defined in claim 12, further comprising a connecting line between the second supply line downstream of the second proportional P/Q valve and the branch line downstream of the second switching valve, the connecting line connecting the pressure space of the second cylinder assembly to the pressure space of the third cylinder assembly, so as to form a differential-action cylinder assembly controlling the movements of the plastification screw; and wherein the connecting line includes a third switching valve, the second and third switching valves being arranged to cooperate in such a way that, when the third switching valve is opened to connect the second and third cylinder assemblies, the second switching valve disconnects the branch line from the first supply line.

14. A hydraulic control system as defined in claim 10, further comprising a hydraulic accumulator and an accumulator branch line connecting the hydraulic accumulator to the second supply line at a junction point which is located between the main pump and the second proportional P/Q valve of the second control unit and a second switching valve in the accumulator branch line.

15. A hydraulic control system as defined in claim 14, wherein the second supply line includes a check valve upstream of said junction point, for the prevention of accumulator discharge in the direction of the main pump.

16. A hydraulic control system as defined in claim 15, further comprising a charging branch line connecting the load line of the pressure maintenance pump to the second supply line, at a point downstream of the check valve, and a pressure inlet valve in the charging branch line restricting fluid flow in the charging branch line to an accumulator-charging flow at a pressure above a predetermined pressure level.

17. A hydraulic control system as defined in claim 10, wherein the second proportional P/Q valve is a pilot-controlled proportional P/Q valve; and the second control unit and its second proportional P/Q valve are arranged in the immediate vicinity of the injection unit, in order to minimize the length of the second supply line downstream of the second proportional P/Q valve.

* * * * *